(12) United States Patent
Yamada

(10) Patent No.: US 8,096,270 B2
(45) Date of Patent: Jan. 17, 2012

(54) CYLINDER BLOCK AND METHOD FOR MANUFACTURING THE SAME

(75) Inventor: Satoshi Yamada, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 393 days.

(21) Appl. No.: 12/441,163

(22) PCT Filed: Sep. 22, 2008

(86) PCT No.: PCT/JP2008/067093
§ 371 (c)(1),
(2), (4) Date: Mar. 13, 2009

(87) PCT Pub. No.: WO2009/060672
PCT Pub. Date: May 14, 2009

(65) Prior Publication Data
US 2010/0175641 A1  Jul. 15, 2010

(30) Foreign Application Priority Data
Nov. 8, 2007 (JP) .................................. 2007-290752

(51) Int. Cl.
*F02F 1/10* (2006.01)
(52) U.S. Cl. ............... 123/41.72; 123/193.2; 29/888.06; 29/888.061
(58) Field of Classification Search ............... 123/41.72, 123/193.2, 668, 669; 29/888.06, 888.061
See application file for complete search history.

(56) References Cited

U.S. PATENT DOCUMENTS

| | | | | |
|---|---|---|---|---|
| 1,836,798 A | * | 12/1931 | Hefti | 138/140 |
| 2,423,395 A | * | 7/1947 | Lieberherr | 123/41.79 |
| 4,093,842 A | * | 6/1978 | Scott | 148/565 |
| 4,562,799 A | * | 1/1986 | Woods et al. | 123/193.2 |
| 4,686,943 A | * | 8/1987 | Anno et al. | 123/41.74 |
| 5,062,393 A | * | 11/1991 | Smith et al. | 123/41.72 |
| 5,083,537 A | * | 1/1992 | Onofrio et al. | 123/195 R |
| 6,167,847 B1 | * | 1/2001 | Ergezen et al. | 123/41.79 |
| 7,104,226 B2 | * | 9/2006 | Endoh et al. | 123/41.79 |
| 2005/0188537 A1 | * | 9/2005 | Westra | 29/888.01 |

FOREIGN PATENT DOCUMENTS

| | | |
|---|---|---|
| AT | 004 875 U1 | 12/2001 |
| DE | 43 17 836 C1 | 8/1994 |
| EP | 2 224 119 A1 | 9/2010 |
| FR | 2758591 A1 * | 7/1998 |
| JP | 60056151 A * | 4/1985 |
| JP | 4-81552 A | 3/1992 |
| JP | 4-303163 A | 10/1992 |

(Continued)

*Primary Examiner* — Noah Kamen
*Assistant Examiner* — Hung Q Nguyen
(74) *Attorney, Agent, or Firm* — Kenyon & Kenyon LLP

(57) ABSTRACT

Provided is a cylinder block which includes a liner and a water jacket having a closed-deck structure in a simple configuration and which has a structure providing high rigidity and enabling easy formation at low cost. A cylinder block of the present invention includes a liner arranged on an inner circumference surface of a bored hole and a water jacket arranged on the outside of the liner in the radial direction. By a bending process of folding back an end portion of a cylinder-shaped member, a hollow portion capable of forming the water jacket is formed integrally in one end portion or both end portions of a liner portion forming the liner, and the cylinder-shaped member is enclosed with a cylinder block forming material by casting.

4 Claims, 4 Drawing Sheets

FOREIGN PATENT DOCUMENTS

| | | | |
|---|---|---|---|
| JP | 05-078950 A | | 10/1993 |
| JP | 9-126047 A | | 5/1997 |
| JP | 09126048 A | * | 5/1997 |
| JP | 2001-152959 A | | 6/2001 |
| JP | 2007-224758 A | | 9/2007 |

* cited by examiner

CYLINDER BLOCK AND METHOD FOR MANUFACTURING THE SAME

This is a 371 national phase application of PCT/JP2008/067093 filed 22 Sep. 2008, claiming priority to Japanese Patent Application No. JP 2007-290752 filed 8 Nov. 2007, the contents of which are incorporated herein by reference.

TECHNICAL FIELD

The present invention relates to a cylinder block and a method for manufacturing the same, and more specifically relates to a cylinder block including a liner arranged on an inner circumference surface of a bored hole and a water jacket arranged on the outside of the liner in the radial direction and a method for manufacturing the same.

BACKGROUND ART

A cylinder block for an internal combustion engine, such as an engine for an automobile, generally includes a liner which is in sliding contact with a piston on an inner surface of a bored hole. On the circumference of the bored hole, a water jacket for causing a cooling medium such as water to flow is provided in order to cool the cylinder block. Generally, such a cylinder block is formed by die-casting of an aluminum alloy as a forming material. In a die-casting mold for forming the cylinder block, a portion for forming the water jacket is provided to protrude in a cavity. When the cylinder block in which the liner is enclosed by casting is formed by setting the liner in the mold and injecting and filling the forming material in the cavity, the circumference of the bored hole provides a so-called open-deck structure in which the water jacket is formed to be open on an end surface of the cylinder block to which a cylinder head is attached.

As the die-cast mold for forming the cylinder block, that in which a core is arranged in the circumference of the bored hole for forming the water jacket is also known. When the core and the liner are set in the mold and the forming material is injected and filled in the cavity to enclose the liner by casting, a so-called closed-deck structure is provided in which a closed water jacket is formed inside the cylinder block on an end portion side to which the cylinder head is attached without an opening on the end surface.

Further, a cylinder block in which a water jacket is formed at a liner and the liner is enclosed by casting is also known (for example, see Patent Document 1). Patent Document 1 discloses a cylinder block structure body for an engine which is formed by die-casting of a light alloy material, the cylinder block structure for an engine including a coolant chamber in which a coolant chamber forming member formed by the same light alloy material as that of the cylinder block as a main component is adhered to the outer circumference of a cylinder liner including an upper wall integral with a ceiling wall of an engine combustion chamber, and in which the cylinder liner with the coolant chamber is enclosed by casting with the die-cast cylinder block.

Patent Document 1

Japanese Patent Application Publication No. JP-A-2001-152959

DISCLOSURE OF THE INVENTION

Problem to be Solved by the Invention

Of the techniques of the related art, in the so-called open-deck structure, the water jacket is formed to be open on the end surface of the cylinder block so the rigidity of the cylinder block is low. Accordingly, when the structure is assembled with a cylinder head or the like to be used as an internal combustion engine, the diameter of the bored hole is increased or deformed at the time of combustion in the cylinder chamber. This results in, for example, a problem of a possible decrease in sealability of a gasket between the cylinder block and the cylinder head and a problem of an increase in friction or an increase in blow-by gas when the size of a piston is set in accordance with the diameter of the bored hole subjected to deformation. Furthermore, in recent years, an air-fuel ratio is set to improve the combustion efficiency for the purpose of improving fuel efficiency of the internal combustion engine and the internal pressure of a cylinder tends to correspondingly increase by the combustion in the cylinder chamber, there is an increasing need for improving the rigidity of the cylinder block. However, when the thickness is increased to improve the rigidity of the cylinder block, there also have been problems of an increase in cost and a drag on fuel efficiency due to an increase in weight.

Of the techniques of the related art, the so-called closed-deck structure formed by arranging the core in the die-cast mold for forming the cylinder block has a problem that a desired water jacket cannot be formed since the core is bent or the like to be damaged when molten metal as the forming material is injected and filled in the cavity of the mold at a predetermined speed and pressure. When the injection filling speed of the molten metal is decreased to an injection speed close to that of a gravity casting beyond the range of die-cast formation in order to avoid this problem, there has been a problem that the productivity decreases to increase the cost since time for each formation cycle increases and the formation accuracy decreases when the pressure of a riser is decreased.

Further, regarding the cylinder block in which the water jacket is formed at the liner and the liner is enclosed by casting of the techniques of the related art, Patent Document 1 describes that a coolant chamber forming plate is welded on the outer circumference of the cylinder liner to form the coolant chamber on an outer circumference surface of the cylinder liner. That is, in Patent Document 1, since it is necessary to separately form the cylinder liner and the coolant chamber forming plate and further weld the coolant chamber forming plate to the cylinder liner, there have been problems of an increase in steps and complexity as well as cost and a decrease in rigidity of the cylinder liner.

Since the temperature is generally apt to rise on a side close to the cylinder head of the cylinder block as shown in a graph (B) of FIG. 8 due to combustion on a top dead center side in the cylinder chamber when the cylinder block is assembled with the cylinder head or the like to be used as the internal combustion engine, the side particularly needs to be cooled. In contrast, since the temperature does not rise as much on a crank case side of the cylinder block compared to the cylinder head side, cooling in a similar manner to that in the side close to the cylinder head causes supercooling. In this manner, appropriately cooling the cylinder block in which the temperature rise differs among portions to a uniform temperature by the water jacket with a simple structure has not been possible in any of the techniques of the related art.

In view of the problems described above, it is an object of the present invention to provide a cylinder block which includes a liner and a water jacket having a closed-deck structure in a simple configuration and which has a structure having high rigidity and enables easy formation at low cost. Also, in view of the problems, it is an object of the present invention to provide a cylinder block having a structure which enables appropriate cooling with a water jacket in a simple configuration.

In view of the problems, it is an object of the present invention to provide a method for manufacturing a cylinder block which includes a liner and a water jacket having a closed-deck structure in a simple configuration and which has high rigidity and enables easy formation at low cost. Also, in view of the problems, it is an object of the present invention to provide a method for easily manufacturing a cylinder block having a structure enabling appropriate cooling with a water jacket in a simple configuration.

Means for Solving the Problem

In order to achieve some of the objects, an invention of a cylinder block of claim 1 provides a cylinder block including a liner arranged on an inner circumference surface of a bored hole and a water jacket arranged on an outside of the liner in a radial direction, characterized in that a cylinder-shaped member in which a liner portion and a hollow portion capable of forming the water jacket are formed integrally at an end portion thereof by a bending process is enclosed with a cylinder block forming material by casting.

Also, in order to achieve some of the objects, an invention of a method for manufacturing a cylinder block of claim 3 provides a method for manufacturing a cylinder block including a liner arranged on an inner circumference surface of a bored hole and a water jacket arranged on an outside of the liner in a radial direction, characterized in that an end portion of a cylinder-shaped member is subjected to a bending process to integrally form a liner portion and a hollow portion capable of forming the water jacket, and the cylinder-shaped member after undergoing the bending process is enclosed with a cylinder block forming material by casting.

Effects of the Invention

According to the invention of the cylinder block of claim 1, a cylinder block which includes the liner and the water jacket having a closed-deck structure can be provided in a simple configuration formed by enclosing the cylinder-shaped member, in which the liner portion and the hollow portion capable of forming the water jacket are formed integrally at the end portion by the bending process, with the cylinder block forming material by casting. The cylinder block has a structure that provides high rigidity and enables easy formation at low cost.

According to the invention of the method for manufacturing a cylinder block of claim 3, the method for manufacturing a cylinder block which includes the liner and the water jacket having a closed-deck structure and which has a structure providing high rigidity and enabling easy formation at low cost can be provided in a simple configuration in which the end portion of the cylinder-shaped member is subjected to the bending process to integrally form the liner portion and the hollow portion capable of forming the water jacket and the cylinder-shaped member after undergoing the bending process is enclosed by the cylinder block forming material by casting.

Exemplary Form of the Invention

Hereinafter, some aspects of the invention which are recognized as claimable in the present application (hereinafter also referred to as "claimable invention" which includes at least "the present invention" or "the invention of the present application" described in the scope of the appended claims and which may include an invention of a narrower concept of the invention of the present application or an invention of a broader concept or a different concept of the invention of the present application) will be shown and described as examples. In a similar manner to the claims, the respective aspects are divided into items, each of which is assigned with a number, and described as dependent from another item if necessary. This is for easier understanding of the claimable invention, and is not intended to limit the combination of components forming the claimable invention to those of the respective items described below. That is, the claimable invention should be construed in consideration of the descriptions accompanying the respective items, the description of the embodiment, or the like. If consistent with the construal, an aspect in which another component is further added to the respective items or an aspect in which a component is deleted from the respective items may also be an aspect of the claimable invention. Note that, in the respective items below, item (1) corresponds to claim 1, item (3) corresponds to claim 2, item (4) corresponds to claim 3, and item (6) corresponds to claim 4.

(1) A cylinder block including a liner arranged on an inner circumference surface of a bored hole and a water jacket arranged on an outside of the liner in a radial direction is characterized in that a cylinder-shaped member in which a liner portion and a hollow portion capable of forming the water jacket are formed integrally at an end portion thereof by a bending process is enclosed with a cylinder block forming material by casting.

In an invention according to item (1), the hollow portion capable of forming the water jacket is integrally formed in an end portion of the liner portion by the bending process of folding back the end portion of the cylinder-shaped member. By enclosing the cylinder-shaped member by casting and forming a hole continuous with the hollow portion, the water jacket is formed easily to provide the cylinder block including the liner and the water jacket. Since the portion of the cylinder-shaped member after undergoing the bending process becomes a rib shape extending in the radial direction of the bored hole, the rigidity of the cylinder block increases.

(2) The cylinder block according to item (1) is characterized in that a size of the hollow portion in the radial direction differs depending on a position in an axial direction.

In an invention according to item (2), based on the invention according to item (1), the size of the hollow portion in the radial direction differs depending on the position in the axial direction in accordance with portions differing in temperature rise of the cylinder block. Accordingly, the cylinder block can be cooled appropriately to a uniform temperature.

(3) The cylinder block according to either item (1) or (2) is characterized in that the hollow portion is formed at both ends of the cylinder-shaped member.

In an invention according to item (3), based on the invention according to either item (1) or (2), both end portions of the cylinder-shaped member are folded back by the bending process to integrally form the hollow portions capable of forming the water jacket in both end portions of the liner portions. By enclosing the cylinder-shaped member by casting and forming a hole continuous with the hollow portion on a cylinder head side, the water jacket is formed easily. By leaving the hollow portion on a crank case side as it is without forming a hole continuous with the inside thereof, a space that can serve as an insulating layer is formed inside the cylinder block. Therefore, the cylinder block can be cooled appropriately to a uniform temperature by cooling the cylinder head side and retaining heat on the crank case side of the cylinder block. In the case where the sizes of the respective hollow portions in the radial direction differ depending on the position in the axial direction in accordance with the temperature rise of the cylinder block, the cylinder block can be adjusted to an appropriate temperature.

(4) A method for manufacturing a cylinder block including a liner arranged on an inner circumference surface of a bored hole and a water jacket arranged on an outside of the liner in a radial direction is characterized in that an end portion of a cylinder-shaped member is subjected to a bending process to integrally form a liner portion and a hollow portion capable of forming the water jacket, and the cylinder-shaped member after undergoing the bending process is enclosed with a cylinder block forming material by casting.

In an invention according to item (4), the end portion of the cylinder-shaped member is folded back by the bending process to integrally form the hollow portion capable of forming the water jacket in an end portion of the liner portion. By setting the cylinder-shaped member in a mold to be enclosed with a cylinder block forming material and forming a hole continuous with the hollow portion as necessary, the water jacket is formed easily. Thus, the cylinder block including the liner and the water jacket is manufactured. Since the portion of the cylinder-shaped member after undergoing the bending process becomes a rib shape extending in the radial direction of the bored hole, the cylinder block having high rigidity can be manufactured.

(5) The method for manufacturing a cylinder block according to item (4) is characterized in that the end portion of the cylinder-shaped member is subjected to the bending process such that a size of the hollow portion in a radial direction differs depending on a position in an axial direction.

In an invention according to item (5), based on the invention according to item (4), the end portion of the cylinder-shaped member is subjected to the bending process such that the size of the hollow portion in the radial direction differs depending on the position in the axial direction in accordance with portions differing in temperature rise of the cylinder block. Accordingly, the cylinder block having a structure which enables appropriate cooling to achieve a uniform temperature can be manufactured.

(6) The method for manufacturing a cylinder block according to either item (4) or (5) is characterized in that both ends of the cylinder-shaped member are subjected to the bending process to form the liner portion and the hollow portions capable of forming the water jacket.

In an invention according to item (6), based on the invention according to either item (4) or (5), the hollow portions capable of forming the water jacket are integrally formed in both end portions of the liner portion by the bending process of folding back both end portions of the cylinder-shaped member. When setting the cylinder-shaped member in the mold, the both end portions can be arranged on either side of the cylinder head side or the crank case side. By injecting and filling the cylinder block forming material in a cavity of the mold in which the cylinder-shaped member is set for casting enclosure and forming a hole continuous with the hollow portion on the cylinder head side, the water jacket can be formed easily. By leaving the hollow portion on the crank case side as it is without forming a hole continuous with the inside thereof, a space that can serve as an insulating layer is formed inside the cylinder block. Therefore, the cylinder block can be manufactured to have a structure which can be cooled appropriately to a uniform temperature by cooling the cylinder head side and retaining heat on the crank case side of the cylinder block. In the case where the sizes of the respective hollow portions in the radial direction formed by the bending process differ depending on the position in the axial direction in accordance with the temperature rise of the cylinder block, the cylinder block can be manufactured to have a structure which can be adjusted to an appropriate temperature.

DESCRIPTION OF THE REFERENCE NUMERALS

Figure 1:
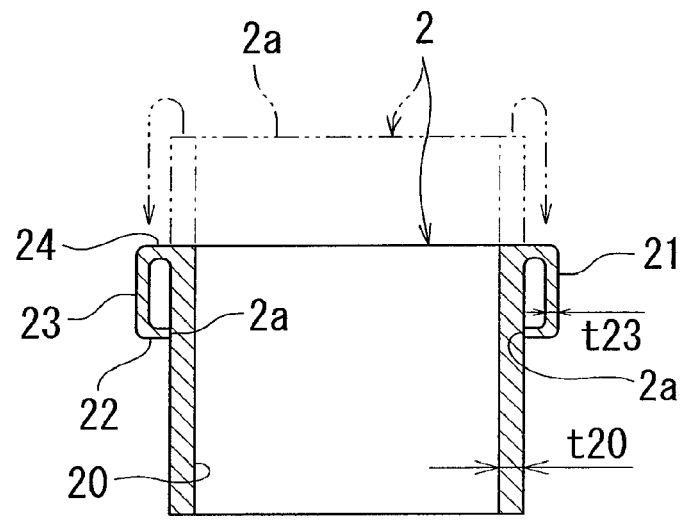
FIG. 1 is a sectional view for illustrating a cylinder-shaped member of a cylinder block according to a first embodiment of the present invention.

1: Cylinder block, 2: Cylinder-shaped member, 3: Cylinder block forming material, 20: Liner portion, 21: Hollow portion, H: Bored hole, WJ: Water jacket, L: Liner, HI: Heat insulating layer

BEST MODES FOR CARRYING OUT THE INVENTION

First, a first embodiment of a cylinder block of the present invention and a method for manufacturing of the same will be described in detail based on FIGS. 1 to 5. In the drawings, the same reference numerals show similar or corresponding portions.

A cylinder block 1 of the present invention briefly includes a liner L arranged on an inner circumference surface of a bored hole H and a water jacket WJ arranged on the outside of the liner in the radial direction, in which a hollow portion 21 capable of forming the water jacket WJ is integrally formed in one end portion or both end portions of a liner portion 20 forming the liner L by a bending process of folding back an end portion of a cylinder-shaped member 2 and in which the cylinder-shaped member 2 is enclosed with a cylinder block forming material 3 by casting.

The method for manufacturing a cylinder block of the present invention is a method for manufacturing the cylinder block 1 which briefly includes the liner L arranged on the inner circumference surface of the bored hole H and the water jacket WJ arranged on the outside of the liner L in the radial direction, in which the hollow portion 21 capable of forming the water jacket WJ is integrally formed in the end portion of the liner portion 20 forming the liner L by the bending process of folding back one end portion or both end portions of the cylinder-shaped member 2 and in which the cylinder-shaped member 2 subjected to the bending process is set in a mold to be enclosed with the cylinder block forming material 3 by casting.

For the cylinder block forming material 3, an aluminum alloy such as, for example, JIS-A390 alloy is employed. For the cylinder-shaped member 2, the same material as that of the cylinder block forming material 3 or a material according to necessity such as a different aluminum alloy or steel is employed. At least a portion forming the liner L of the cylinder-shaped member 2 is formed to have a uniform thickness t20 of 3 to 5 mm throughout the entire length in, for example, a state before the bending process in consideration of a machining allowance for a machining process such as a grinding process to be performed after a casting enclosure. The cylinder-shaped member 2 has a predetermined length in the axial direction and has an inner diameter in accordance with an outer diameter of a piston for assembly as an internal combustion engine.

In the embodiment shown in FIG. 1, the cylinder-shaped member 2 is subjected to the bending process in which one tip end thereof (upper tip end in FIG. 1) is folded back toward the outside in the radial direction by a press process, spinning process, or the like such that an outside portion 23 becomes parallel to an outer circumference surface of the liner portion 20 with a predetermined interval (in the case of the embodiment shown in FIG. 1) and an end surface 2a contacts the outer circumference surface of the liner portion 20. An intermediate portion and the other tip end (lower tip end in FIG. 1) which are not subjected to the bending process of folding back directly become the liner portion 20. Since the diameter of the outside portion 23 is particularly enlarged and extended in the circumferential direction by the bending process of folding back the cylinder-shaped member 2 toward the outside in the radial direction, a thickness t23 of the outside portion 23 changes to become thinner than the thickness t20 of the liner portion. A deck portion 24 and a tip end portion 22 form a flange shape extending in the radial direction. By the outer circumference surface of the liner portion 20, the deck portion 24, the outside portion 23, and the tip end portion 22, the hollow portion 21 is formed integrally in one end of the liner portion 20 (in the case of the embodiment shown in FIG. 1). Note that, since the hollow portion 21 becomes a hermetically-sealed space by a casting enclosure with the cylinder block forming material 3 as described later, a process such as welding of the end surface 2a of the cylinder-shaped member 2 to the outer circumference surface of the liner portion 20 is not necessary, and a process of achieving a contact to an extent that molten metal of the cylinder block forming material 3 does not enter inside suffices.

Figure 2:
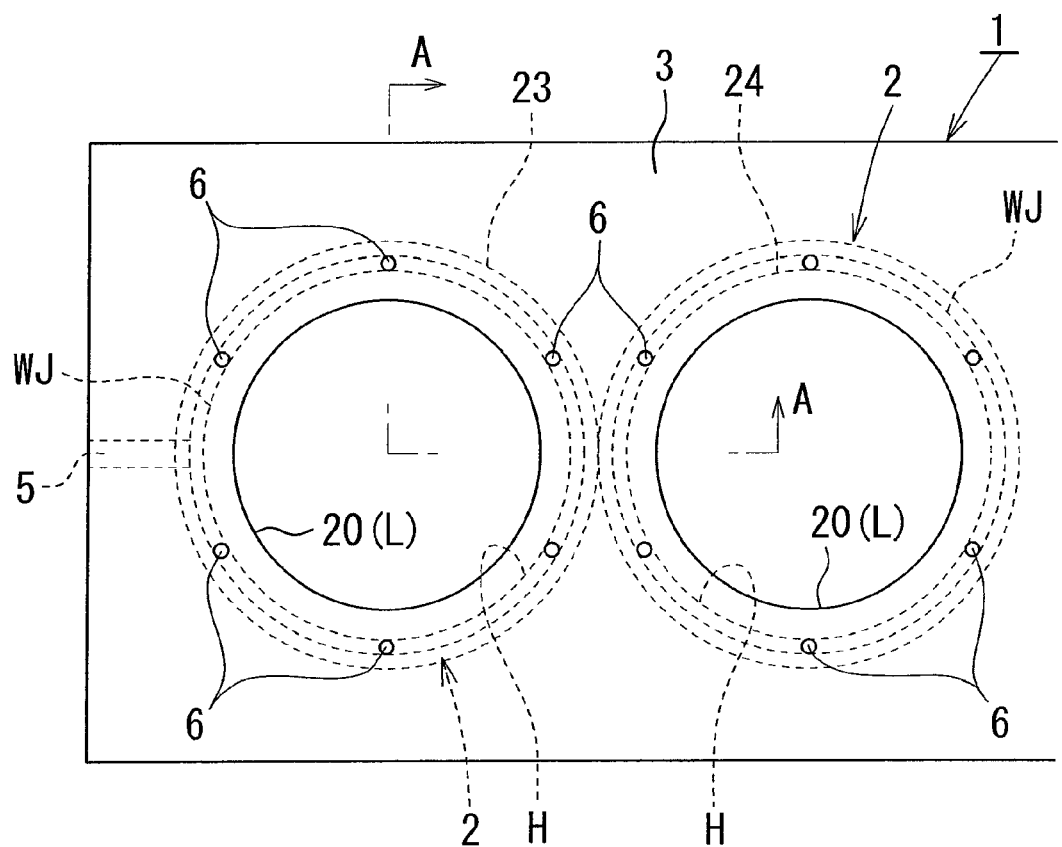
FIG. 2 is a plan view of the cylinder block according to the first embodiment of the present invention.
Figure 3:
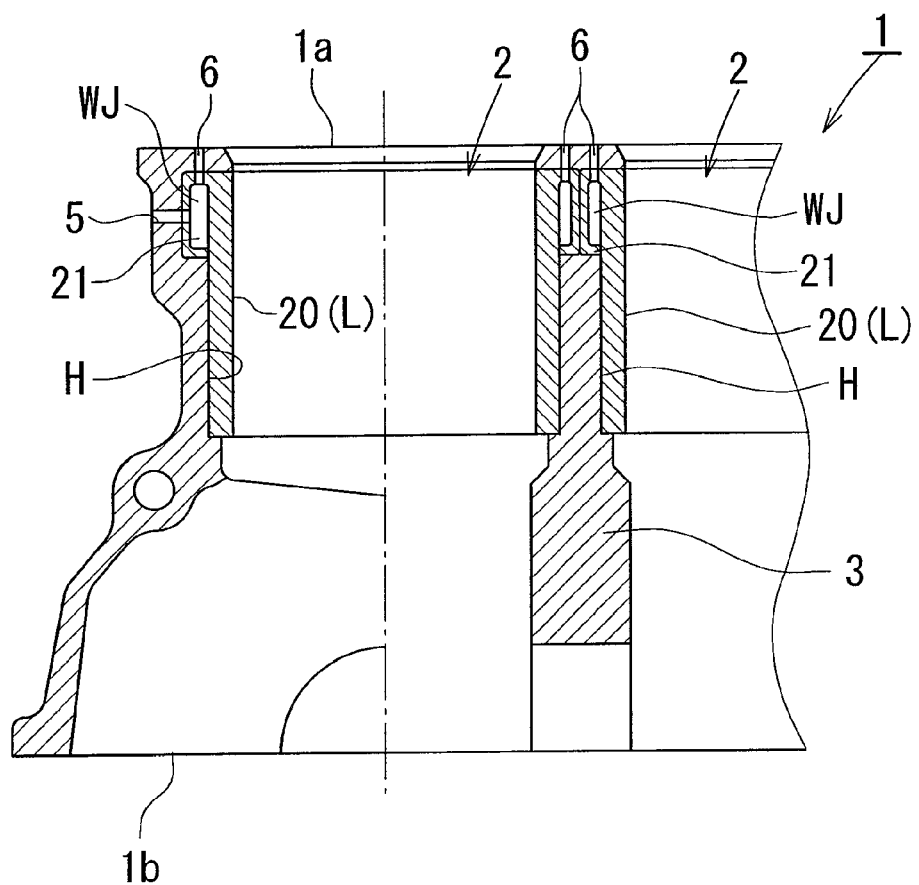
FIG. 3 is a partial sectional view along line A-A of FIG. 2 for illustrating the cylinder block according to the first embodiment of the present invention.

Next, one or a plurality of the cylinder-shaped members 2 are set in the mold in accordance with the number of cylinders of the internal combustion engine, the molten metal of the cylinder block forming material 3 is injected and filled in the cavity by the die-casting method or the like, and the cylinder block forming material 3 is solidified and taken out. On the outside of one end of the liner portion 20 in the radial direction, the hollow portion 21 hermetically sealed by the cylinder block forming material 3 is formed. Then, as shown in FIGS. 2 and 3, a hole 5 in the horizontal direction connecting to the hollow portion 21 of the cylinder-shaped member 2 located in the end portion is drilled laterally in the cylinder block 1, and a plurality of holes 6 in the vertical direction (plate thickness direction of the deck portion 24) connecting to the deck portion 24 of the hollow portion 21 of each cylinder-shaped member 2 are drilled on an upper surface of the cylinder block 1. The hole 5 is for connecting with a pump for supplying/discharging a cooling medium, and the hole 6 is for connecting with the hollow portion 21 of the adjacent cylinder-shaped member 2 via a pipe path provided in the cylinder head. By the hole 5 and the holes 6 being drilled, the hollow portion 21 becomes the water jacket WJ for supplying and circulating the cooling medium.

In the cylinder block 1 manufactured in a manner described above, the liner portion 20 and the hollow portion 21 at the end portion thereof are formed integrally by the bending process of folding back the cylinder-shaped member 2. Thus, the cylinder block 1 including the liner L and the water jacket WJ having a closed-deck structure is easily manufactured only with the few steps of enclosing the cylinder-shaped member 2 with the cylinder block forming material 3 by casting and drilling the hole 5 and the holes 6 connecting to the hollow portion 21 in necessary parts. Since the present invention does not require a core for forming the water jacket as in the related art, the injection filling speed or pressure of the molten metal of the cylinder block forming material 3 do not need to be set low when enclosing the cylinder-shaped member 2 by casting. Therefore, the time for one formation cycle can be shortened to reduce the cost, and the cylinder block 1 can be manufactured with high accuracy. Further, since the deck portion 24 and the tip end portion 22 forming the hollow portion 21 form a flange shape extending in the radial direction in the cylinder block 1 of the present invention, the whole cylinder block 1 is not formed to be thick, and rigidity is provided to sufficiently withstand an air-oil ratio in which the internal pressure of the cylinder increases due to combustion in the cylinder chamber. Therefore, the fuel efficiency can be improved. Also, since the thickness t23 of the outside portion 23 forming the hollow portion 21 changes to become thinner, heat radiation improves along with an improvement in heat conductivity of the cylinder block 1.

Figure 4:
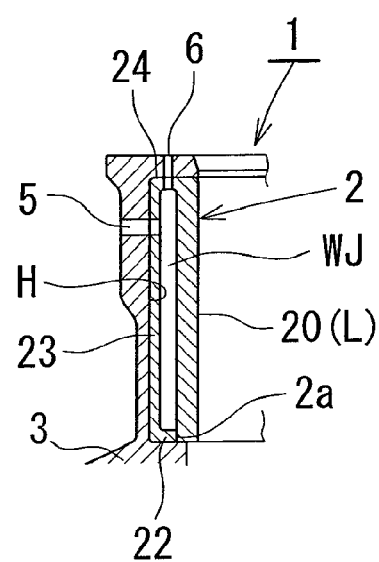
FIG. 4 is a partial sectional view for illustrating a modified example of the cylinder block according to the first embodiment of the present invention.
Figure 5:
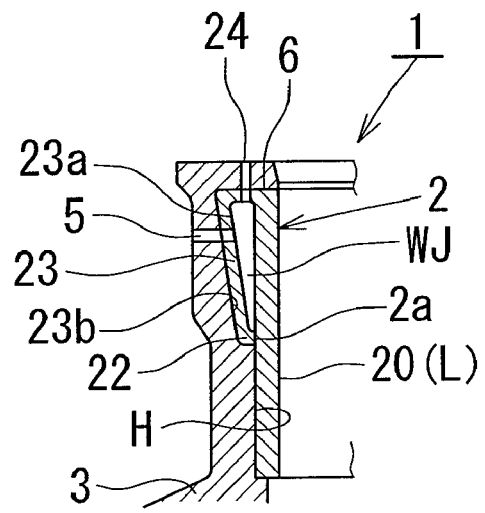
FIG. 5 is a partial sectional view for illustrating another modified example of the cylinder block according to the first embodiment of the present invention.

Note that the present invention is not limited to the embodiment described above, and the cylinder-shaped member 2 in which the hollow portion 21 forming the water jacket WJ over the entire length of the liner L in the axial direction is formed may be enclosed by casting, as shown in FIG. 4. The outside portion 23 of the hollow portion 21 is not limited to that in which the cylinder-shaped member 2 is subjected to the bending process to be parallel to the outer circumference surface of the liner portion 20, and a bending process of providing a large diameter on a cylinder head assembly side 23a and a small diameter on a crank case assembly side 23b is also possible, as shown in FIG. 5. By forming the hollow portion 21 as shown in FIG. 5, the cylinder head assembly side of the cylinder block 1 is efficiently cooled and supercooling of the crank case assembly side can be prevented.

Figure 6:
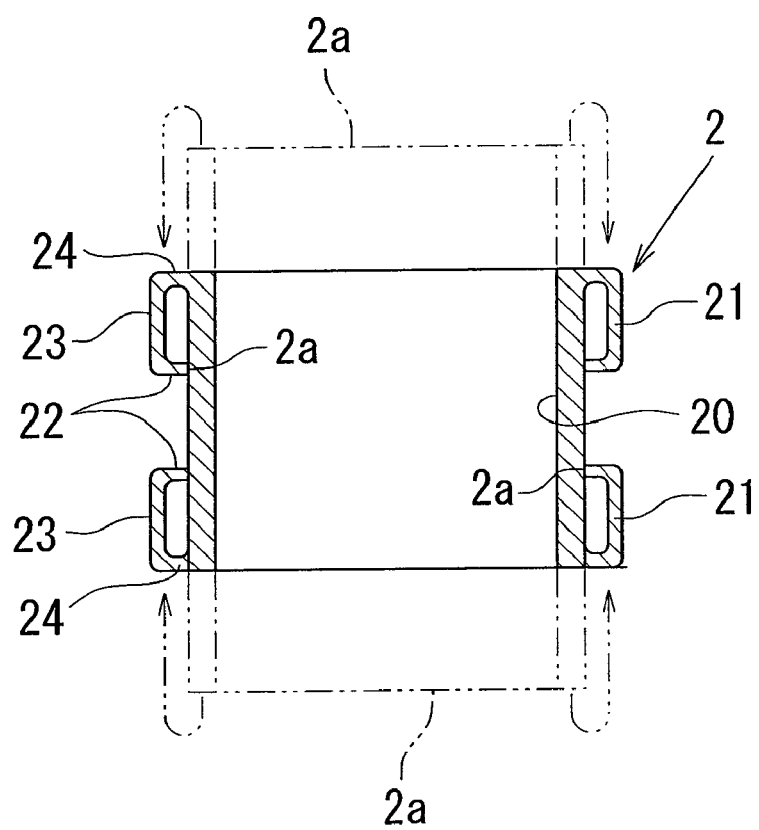
FIG. 6 is a sectional view for illustrating a cylinder-shaped member of the cylinder block according to a second embodiment of the present invention.

Next, a second embodiment of the cylinder block 1 of the present invention will be described in detail based on FIGS. 6 to 8. Note that, in this embodiment, portions similar or corresponding to those of the first embodiment described above are denoted by the same reference numerals and descriptions thereof will be omitted. Only differing portions will be described.

In the first embodiment described above, the cylinder-shaped member 2 is formed with the hollow portion 21 in one end of the liner portion 20 (see FIG. 1). In contrast, the cylinder-shaped member 2 of this embodiment is subjected to a bending process of folding back both ends to form hollow portions 21 having similar lengths in the axial direction at both ends of the liner portion 20, as shown in FIG. 6. By the similar hollow portions 21 being formed at both ends in this manner, the direction of setting the mold does not need to be limited for the casting enclosure with the cylinder block forming material 3. An intermediate portion not subjected to the bending process of folding back directly becomes the liner portion 20.

Figure 7:
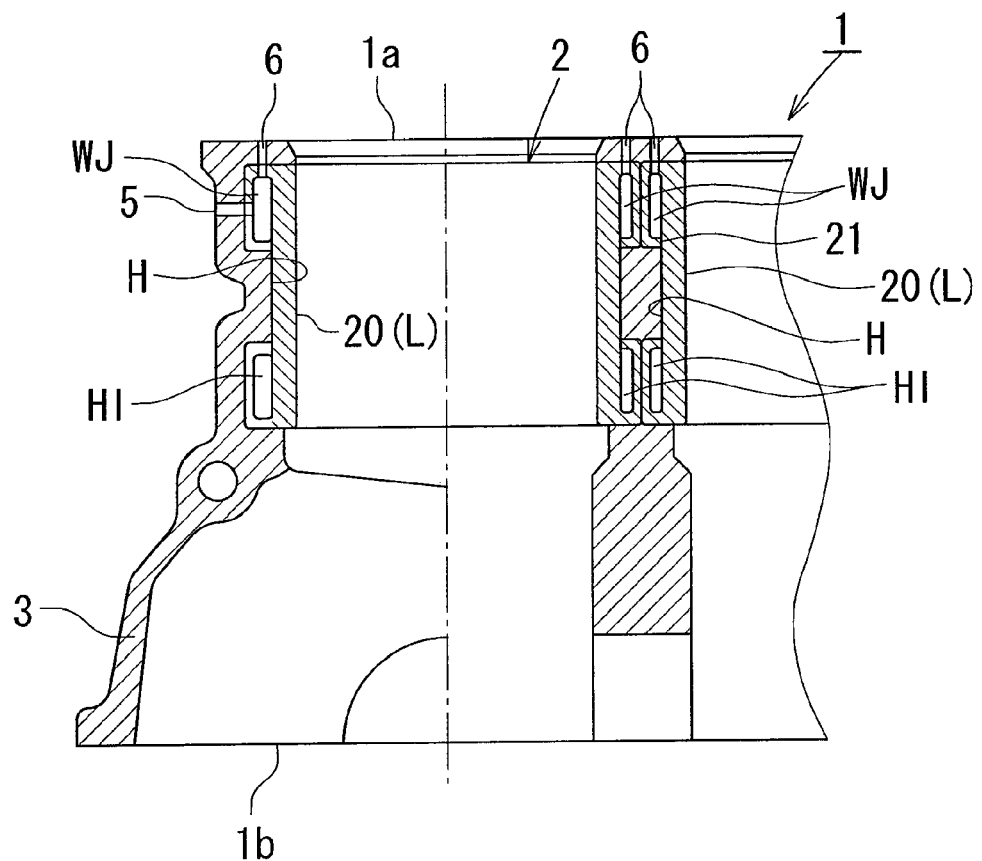
FIG. 7 is a partial sectional view for illustrating the second embodiment of the cylinder block of the present invention.
Figure 8:
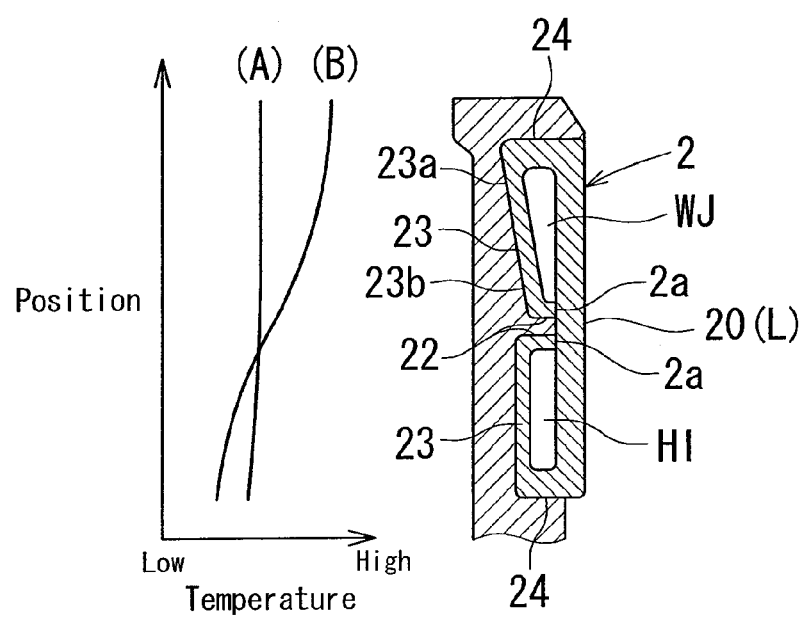
FIG. 8 is an illustrative view showing changes of temperature depending on positions in cylinder blocks according to the present invention and the related art.

In the second embodiment, as shown in FIG. 7, the holes 5 and 6 are drilled in a similar manner to that of the first embodiment in the hollow portion 21 on the cylinder head assembly side (upper side in FIG. 7) to form the water jacket WJ, and the hollow portion 21 on the crank case side (lower side in FIG. 7) is left as it is without drilling the holes 5 and 6. The hollow portion 21 on the crank case side becomes a space hermetically sealed by the casting enclosure with the cylinder block forming material 3.

The present invention is not limited to the second embodiment, and a bending process of providing a large diameter on the cylinder head assembly side and a small diameter on the crank case assembly side in the outside portion 23 of the hollow portion 21 located on at least the cylinder head side is also possible in a similar manner to that shown in FIG. 5 as necessary.

The hollow portion 21 on the crank case side of the cylinder block 1 of the second embodiment is a hermetically-sealed space, and therefore functions as a heat insulating layer HI. Therefore, a top dead center side, i.e., the cylinder head side, where temperature is apt to rise due to combustion in the cylinder chamber (see upper side of a graph (B) position in FIG. 8) is appropriately cooled by the water jacket WJ formed of the hollow portion 21. Since heat is appropriately retained by the heat insulating layer HI formed of the hollow portion 21 on the crank case side where temperature does not rise as much compared to the cylinder head side of the cylinder block 1 (see lower side of the graph (B) position in FIG. 8), it is entirely adjusted to an approximately uniform temperature distribution regardless of the position of the cylinder block 1, as shown by (A) of FIG. 8.

The invention claimed is:

1. A cylinder block which comprises a liner arranged on an inner circumference surface of a bored hole and a water jacket arranged on an outside of the liner in a radial direction, wherein
   a cylinder-shaped member in which a liner portion and a hollow portion capable of forming the water jacket are formed integrally at an end portion thereof by a bending process is enclosed with a cylinder block forming material by casting, and
   the water jacket is configured to have a deck portion, an outside portion, a tip end portion, a part of the liner portion, and an end surface, the end surface being adapted to make a point contact relative to the outer circumference surface of the part of the liner portion to an extent that a molten metal of the cylinder block forming material does not penetrate into the cylinder block.

2. The cylinder block according to claim 1, wherein the hollow portion is formed at both ends of the cylinder-shaped member.

3. A method for manufacturing a cylinder block which comprises a liner arranged on an inner circumference surface of a bored hole and a water jacket arranged on an outside of the liner in a radial direction, wherein
   an end portion of a cylinder-shaped member is subjected to a bending process to integrally form a liner portion and a hollow portion capable of forming the water jacket, and the cylinder-shaped member after undergoing the bending process is enclosed with a cylinder block forming material by casting.

4. The method of manufacturing a cylinder block according to claim 3, wherein both ends of the cylinder-shaped member are subjected to the bending process to form the liner portion and the hollow portions capable of forming the water jacket.

* * * * *